(12) United States Patent
Bailleul et al.

(10) Patent No.: US 7,882,487 B2
(45) Date of Patent: Feb. 1, 2011

(54) METHOD OF GENERATING C CODE ON THE BASIS OF UML SPECIFICATIONS

(75) Inventors: Arnaud Bailleul, Toulouse (FR); Thierry Le-Saux, Cugnaux (FR)

(73) Assignee: Thales (FR)

( * ) Notice: Subject to any disclaimer, the term of this patent is extended or adjusted under 35 U.S.C. 154(b) by 1180 days.

(21) Appl. No.: 10/582,211

(22) PCT Filed: Dec. 6, 2004

(86) PCT No.: PCT/EP2004/053292

§ 371 (c)(1),
(2), (4) Date: Jun. 8, 2006

(87) PCT Pub. No.: WO2005/066769

PCT Pub. Date: Jul. 21, 2005

(65) Prior Publication Data

US 2008/0098350 A1    Apr. 24, 2008

(30) Foreign Application Priority Data

Dec. 9, 2003    (FR) .................................. 03 14397

(51) Int. Cl.
*G06F 9/44*    (2006.01)
(52) U.S. Cl. ...................................... 717/106
(58) Field of Classification Search ................ None
See application file for complete search history.

(56) References Cited

U.S. PATENT DOCUMENTS 6,598,219 B1 *    7/2003    Lau ............................. 717/108

2007/0150523 A1    6/2007    Bailleul et al.
2007/0168920 A1    7/2007    Bailleul
2007/0168921 A1    7/2007    Bailleul et al.
2007/0240097 A1    10/2007    Bailleul et al.

OTHER PUBLICATIONS

Business Wire, "I-Logix Brings XML-Based XMI Standard to the Real-Time Marketplace, Driving Enterprise Collaboration and Paving the Way for Collaborative Commerce", Sep. 26, 2000, http://www.allbusiness.com/technology/software-services-applications-markup/6510699-1.html.*
Sodifrance, "Model-in-Action", May 2003, http://web.archive.org/web/20030507195031/www.mia-software.com/en/product/index.php?lang=en.*
Ben Campbell et al., "TortoiseCVS", 2003, http://cedric.babault.free.fr/TortoiseCVSDoc/UserGuide_en.html.*
Laurent Doldi, "Validation of Communications Systems with SDL: The ARt of SDL Simulation and Reachability Analysis", 2003, John Wiley & Sons, Ltd.*

* cited by examiner

*Primary Examiner*—Wei Y Zhen
*Assistant Examiner*—Lanny Ung
(74) *Attorney, Agent, or Firm*—Lowe Hauptman Ham & Berner, LLP

(57) ABSTRACT

The method in accordance with the invention is characterized in that a detailed implementation model is produced in the UML language, that the data of this model are structured to render them utilizable by the scripts generation tool "ModelInAction" (termed "MIA" and produced by the company Sodifrance), and that this tool is made to produce files in the C language, namely .C files, .H files, a generation report file, configuration management "batch" files and compilation project files.

10 Claims, 2 Drawing Sheets

METHOD OF GENERATING C CODE ON THE BASIS OF UML SPECIFICATIONS

CROSS-REFERENCE TO RELATED APPLICATIONS

The present Application is based on International Application No. PCT/EP2004/053292, filed on Dec. 6, 2004, which in turn corresponds to FR 03/14397 filed on Dec. 9, 2003, and priority is hereby claimed under 35 USC §119 based on these applications. Each of these applications are hereby incorporated by reference in their entirety into the present application.

BACKGROUND OF THE INVENTION

1) Field of the Invention

The subject matter of the present invention is a method for generating C code on the basis of UML specifications.

2) Description of Related Art

There exist generators of C code on the basis of UML code, such as that from the company I-LOGIX, but the C language, not being an object code, it is not possible for <<object>> concepts such as heritage and polymorphism to be transcribed directly and automatically into C code. This impossibility limits the benefit of the use of UML modeling to produce C code. The known generators of C code produce only code <<skeletons>> or code reflecting a very limited use of UML concepts.

SUMMARY OF THE INVENTION

The subject matter of the present invention is a method of generating C code on the basis of UML language specifications of a model, making it possible to automatically produce the entirety of the C code, both a static code (including the generation of classes and of relations) and a dynamic code (in particular for state machines), the code produced complying advantageously with the Do-178B level A specifications. The subject matter of the present invention is also a method which guarantees complete consistency between the C code generated and the specifications written in the UML model, which makes it possible to produce a C code generation report simultaneously with the generation of this code, as well as scripts for configuring, advantageously for the <<Clearcase>> tool from the company Rational-IBM. In the case of embedded systems, the C code thus produced for such systems will directly be embedded software.

The method in accordance with the invention is characterized in that a detailed implementation model is produced in UML code, that the data of this model are structured to render them utilizable by the scripts generation tool "ModelInAction" (termed "MIA" and produced by the company Sodifrance), and that this tool is made to produce files in the C language, namely ".C" files, ".H" files, a generation report file, configuration management "batch" files and compilation project files.

According to an advantageous characteristic of the invention, the C code generated covers 100% of the UML specification of the software (the software generated is the embedded software) namely that the whole generation spectrum is processed both statically (relations/classes) and dynamically (state machines).

BRIEF DESCRIPTION OF THE DRAWINGS

The present invention will be better understood on reading the detailed description of a mode of implementation, taken by way of nonlimiting example and illustrated by the appended drawing, in which.

DETAILED DESCRIPTION OF THE INVENTION

Figure 1:
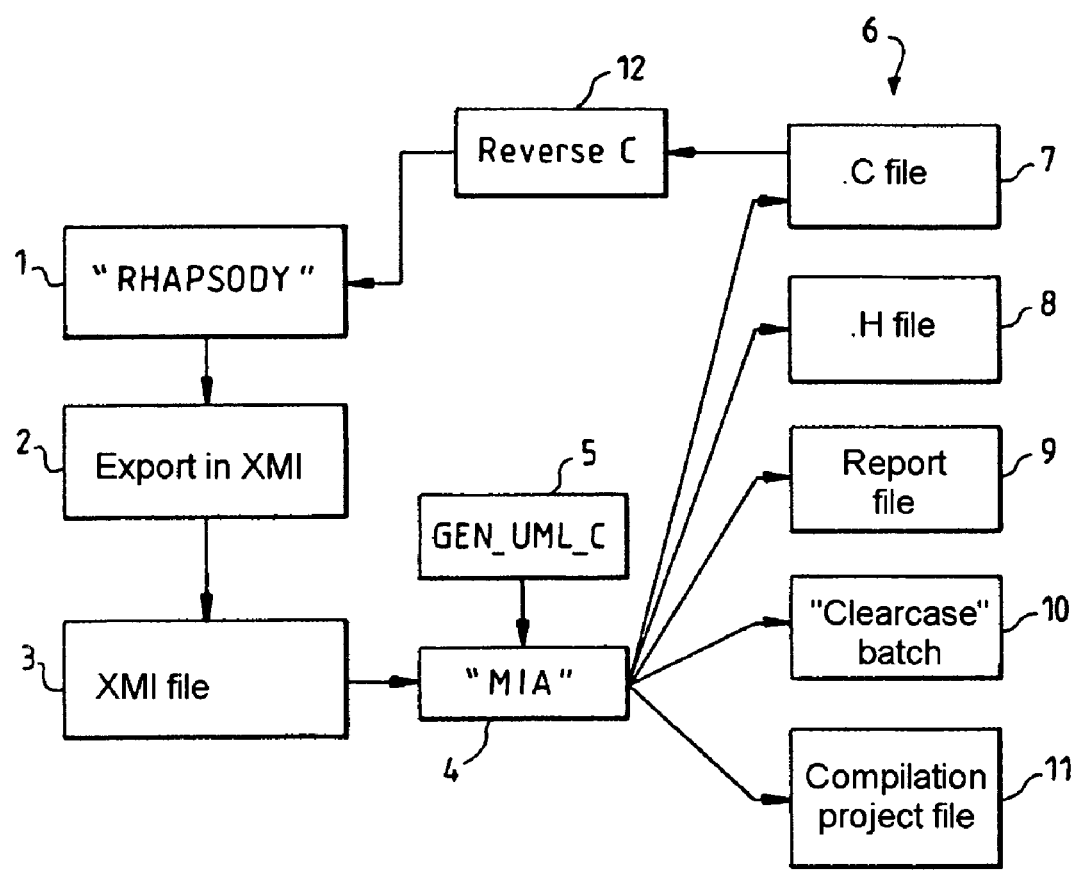
FIG. 1 is a diagram illustrating the main steps of the method of the invention.

In the example described hereinbelow, a UML language model is devised, in a conventional manner, with the aid of a tool (1) commonly used for this purpose, for example the <<RHAPSODY>> tool from the company I-LOGIX. The model thus created is exported (2) in the form of a file (3) in the XMI language. The production of the XMI file is done, for example, with the aid of an export toolkit such as the <<XMI Toolkit >> from the company I-LOGIX. The file 3 makes it possible to inject the UML data structure of said model into a file generation engine (4). This engine (4) is here the <<Model In Action >> tool (more simply dubbed <<MIA>>) from the company SODIFRANCE. It is associated with a scripts parametrization application (5), dubbed GEN_UML_C, produced by the Applicant. The engine (4) implements the application (5) to produce a series of five kinds of files, referenced (6) as a whole, representing the C code corresponding to the starting model.

The series 6 of files comprises: <<.C>> files (7), <<H>> files (8), a code generation report file (9) (as demanded by the aforesaid. Do specifications), a <<batch >> file (10) in accordance with the <<Clearcase>> specifications and compilation project files (11). The files 7, 8 and 11 being produced in conventional manner, will not be described in greater detail.

It is possible to manually modify the body of the procedures of the <<.C>> files generated. During subsequent generations, these modifications will not be overwritten but preserved and integrated within the new files generated. With MDE (Model Driven Engineering) in mind, in which the model and not the source files are the core of the development, it is preferable to upload these manual modifications to the model. It is then possible to integrate these modifications automatically into the model with the aid of the <<roundtrip>> tool called <<ReverseC>> (12).

Figure 2:
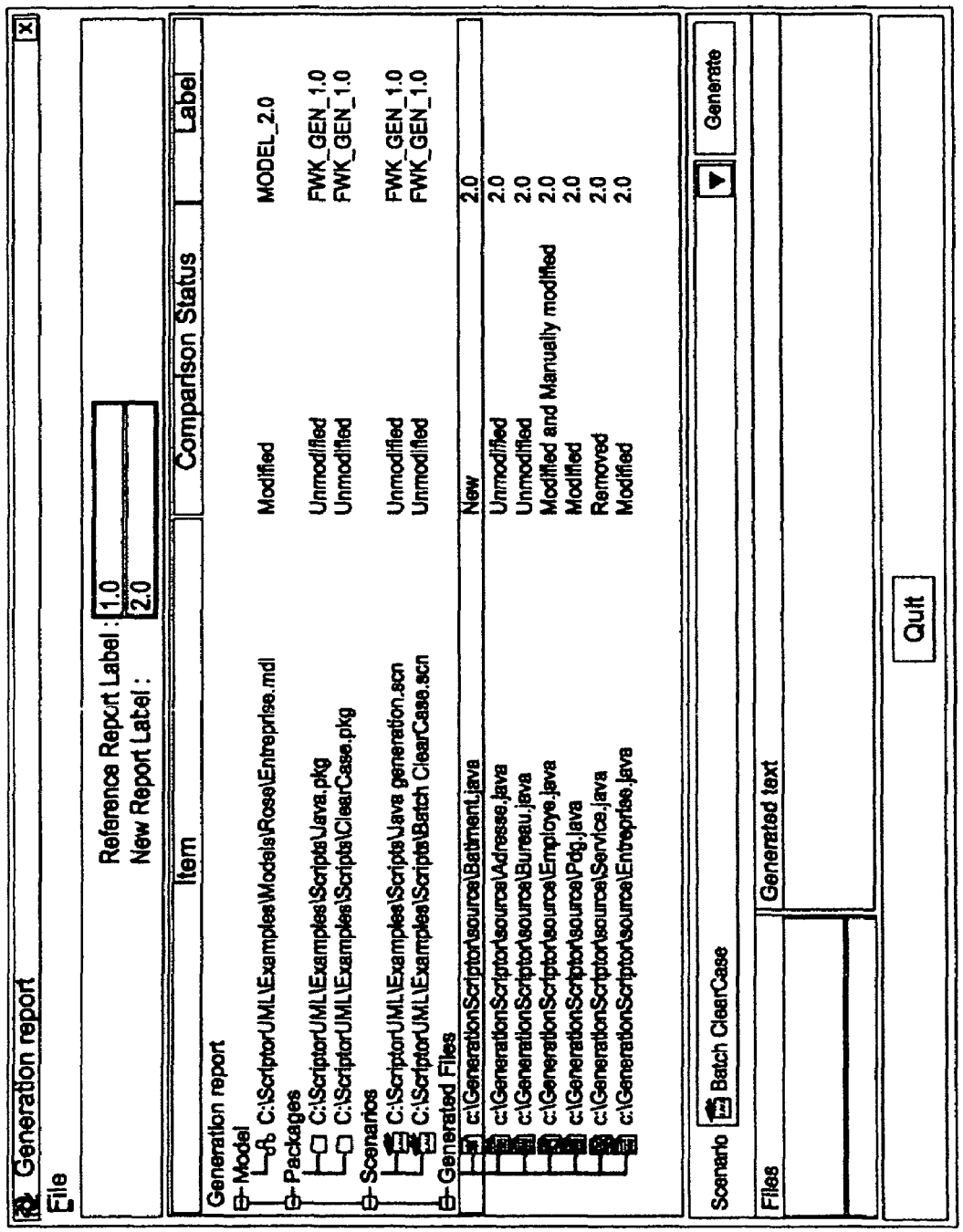
FIG. 2 is a partial view of an exemplary generation report, corresponding to a generation report file that may be produced according to the method of the invention.

The report file (9) makes it possible to keep a log of the generation of the C code and to intercompare two versions of generation reports. In the present case, the report is an XML file comprising all the information corresponding to the UML model, the files and <<packages )>> produced, the generation scenarios used, etc. An example of a screen shot of an extract of such a report (<<Generation report>>) is represented in FIG. 2. With each element of this report is associated one or more checksums (for example 32-bit CRCs) making it possible to perform the comparison between different versions and the detection of the modifications between these versions, for example between a new version of a generation and a reference version of a generation.

On the basis of the comparisons thus made, various states are deduced which provide a <<comparison state>> of the file examined. The table below provides these comparison states.

| Comparison states | Description of the comparison state of the file |
|---|---|
| New | The << new >> state is reserved for files that are new with respect to the reference version. |
| Unmodified | Applies when no modification has been made to a file with respect to the reference file. |
| Modified | Applies when there have been modifications due solely to modifications of the UML model with respect to the reference file. |
| Manually modified | Applies in the case of manual modifications with respect to the reference version. |
| Modified & manually modified | Applies in the case of modifications of both types of a file with respect to the reference version. |
| Removed | Applies when a file no longer exists in a new version. An eliminated file is no longer taken into consideration in the subsequent generation reports. |

As illustrated in FIG. 2, a generation report in accordance with the invention comprises in windows, as header, the following two items of information:

Label of the version number of the reference report ("Reference report label"),

Label of the version number of the current report ("New report label"), originating from a previous version of the generation.

Thereafter the body of the report comprises the following three columns: "item" (designation of the various constituent elements and access path in their storage unit), "Comparison status" (comparison state, in accordance with the table above) and "label" (indicating the version numbers in their category). The elements appearing in the first column are the following:

Designation of the UML model. Here, its state is "modified" and its version number is 2.0, Designation of the software collections ("packages"). In the example described here, these are Java and Clearcase collections. Here, they are unmodified and their version is 1.0, Designation of the generation scenarios. In the example, these are Clearcase "batch" and Java generation scenarios. Here, they are unmodified and their version is 1.0, Designation of the files generated. In the example, these files are seven in number, all of version 2.0, the first is new, the statuses of the others being various, as indicated in the second column.

The bottom of the report comprises a window indicating the name of the scenario in progress ("batch Clearacase" in the present case), a "generate" button for launching a run of the generation of the scenario, and a first "files" window indicating the names of the Clearcase text files generated in this scenario, and a second "generated text" window displaying the text of these files.

The Clearcase "batch" files are generated in such a way as to automatically update the Clearcase table comprising all the files of code generated, in accordance with the information appearing in the generation report. The updating of the Clearcase table is done in two phases, with the running of the following two PERL files:

"checkout.txt": this file prepares the update of the Clearcase table by verifying all the files modified, "checkin.txt": this file represents the updated Clearcase table.

The invention claimed is:

1. A method of generating C code on the basis of Unified Modeling Language (UML) specifications, the method comprising:

producing a detailed implementation model in UML code (UML model);

exporting an Extensible Markup Language (XML) Metadata Interchange (XMI) file based on the detailed implementation model;

dispatching the XMI file to a file generation engine tool, wherein the file generation tool is Model in Action;

associating the file generation engine tool with a scripts parameterization application; and producing files in C language utilizing the file generation engine tool, wherein the files include C files, H files, a generation report file, configuration management batch files and compilation project files, wherein the generation report file includes the files of generated C code, wherein the configuration management batch files are Clearcase batch files for Clearcase scenarios, and wherein the configuration management batch files automatically update the a Clearcase table according to information contained in the generation report file.

2. The method as claimed in claim 1, wherein the C code generated covers 100% of the UML specification of the software, the whole generation spectrum being processed both statically and dynamically.

3. The method as claimed in claim 1, wherein the detailed implementation model is produced with the aid of a UML modeling tool.

4. The method as claimed in claim 3, wherein the producing the detailed implementation model is produced utilizing RHAPSODY from the company I-LOGIX.

5. The method as claimed in claim 1, wherein the generation report file comprises the following information:

version number of a reference report;

version number of a current report;

designation of the UML model with its state and its version number;

designation of software collections produced with their state and their version number;

designation of generation scenarios with their state and their version number;

designation of files generated with their state and their version number;

name of a scenario in progress; and name of generated text files of the scenario.

6. The method as claimed in claim 5, wherein states of the files generated are comparison states with respect to those of a previous generation.

7. The method as claimed in claim 1, wherein the state of each file is one of the following:

new;

unmodified;

modified;

modified manually;

modified and modified manually;

and eliminated.

8. The method as claimed in claim 2, wherein the generation report file comprises the following information:

a version number of a reference report;

a version number of a current report;

a designation of the UML model with its state and its version number;

a designation of software collections produced with their state and their version number;

a designation of generation scenarios with their state and their version number;

a designation of the files generated with their state and their version number;

a name a scenario in progress; and a name of generated text files of the scenario.

9. The method as claimed in claim 3, wherein the generation report file comprises the following information:

a version number of a reference report;

a version number of a current report;

a designation of the UML model with its state and its version number;

a designation of software collections produced with their state and their version number;

a designation of generation scenarios with their state and their version number;

a designation of the files generated with their state and their version number;

a name of a scenario in progress; and a name of the generated text files of the scenario.

10. The method as claimed in claim 4, wherein the generation report file comprises the following information:

a version number of a reference report;

a version number of a current report;

a designation of the UML model with its state and its version number;

a designation of software collections produced with their state and their version number;

a designation of generation scenarios with their state and their version number;

a designation of the files generated with their state and their version number;

a name of a scenario in progress; and a name of the generated text files of the scenario.

* * * * *